United States Patent [19]
Mizumoto et al.

[11] Patent Number: 5,451,986
[45] Date of Patent: Sep. 19, 1995

[54] IMAGE FORMATION DEVICE HAVING PHOTOCONDUCTIVE INK BASED INK SHEET RECONDITIONING

[75] Inventors: Teruyuki Mizumoto; Hajime Kurihara, both of Suwa, Japan

[73] Assignee: Seiko Epson Corporation, Tokyo, Japan

[21] Appl. No.: 97,576

[22] Filed: Jul. 26, 1993

Related U.S. Application Data

[63] Continuation of Ser. No. 679,066, filed as PCT/JP90/01280, Oct. 4, 1990, abandoned.

[30] Foreign Application Priority Data

| Oct. 5, 1989 | [JP] | Japan | 1-260890 |
| May 18, 1990 | [JP] | Japan | 2-128767 |
| Jul. 16, 1990 | [JP] | Japan | 2-187539 |

[51] Int. Cl.$^6$ ............................................. B41J 31/14
[52] U.S. Cl. ........................... 347/217; 355/210; 355/245; 430/138
[58] Field of Search ........... 346/76 PH; 400/198, 400/200, 201, 202.2; 430/138; 355/245, 210, 27, 202, 257; 358/300

[56] References Cited

U.S. PATENT DOCUMENTS

| 4,467,332 | 8/1984 | Akutsu | 400/200 |
| 4,646,164 | 2/1987 | Kishi | 358/300 |
| 4,804,994 | 2/1989 | Sasaki et al. | 355/3 D |
| 4,931,876 | 6/1990 | Hashizume | 358/300 |
| 5,005,043 | 4/1991 | Kobayashi et al. | 430/138 X |
| 5,034,301 | 7/1991 | Miyagawa et al. | 430/138 |
| 5,043,314 | 8/1991 | Suzuki et al. | 430/138 X |
| 5,090,828 | 2/1992 | Shimura et al. | 400/201 |
| 5,111,237 | 5/1992 | Yamamoto et al. | 355/27 |

FOREIGN PATENT DOCUMENTS

| 0030874 | 3/1981 | Japan | 400/198 |
| 189865 | 11/1982 | Japan | . |
| 155983 | 9/1983 | Japan | . |
| 0155984 | 9/1983 | Japan | 400/198 |
| 291649 | 12/1986 | Japan | . |
| 66977 | 3/1987 | Japan | . |
| 2297084 | 12/1988 | Japan | . |
| 115550 | 8/1989 | Japan | . |
| 0209178 | 8/1989 | Japan | . |

*Primary Examiner*—Benjamin R. Fuller
*Assistant Examiner*—N. Le
*Attorney, Agent, or Firm*—Eric B. Janofsky

[57] ABSTRACT

A thermal transfer type image formation device employs a new regeneration method for reconditioning ink sheets employed in the thermal inking process. The ink sheet has a transparent base layer, which also serves as a dielectric layer, an ink layer and a transparent conductive layer, functioning also as an electrode, on a side of the base layer opposite the ink layer. A fixing device is provided for the transfer of photoconductive powder ink to bare areas of the ink sheet to be rejuvenated. A bias voltage is impressed on the photoconductive powder ink, and the photoconductive powder ink which comes in contact with bare areas becomes conductive when exposed with light through the transparent conductive layer and ink adheres to the base layer due to an established electrostatic force between the ink and the conductive layer electrode on the light exposing side of the ink sheet. After the powder ink has been selectively supplied to the bare areas, the ink sheet is then regenerated by heating the sheet melting and thereafter hardening the powder ink.

14 Claims, 5 Drawing Sheets

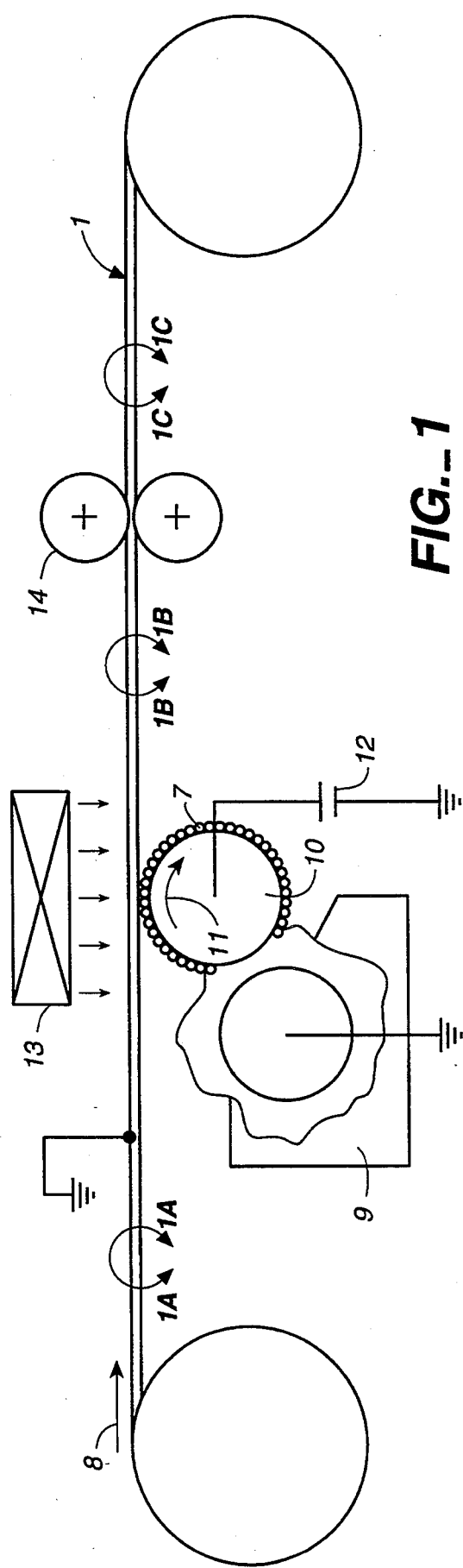
FIG._1
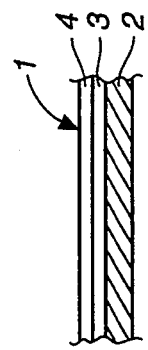
FIG._1C
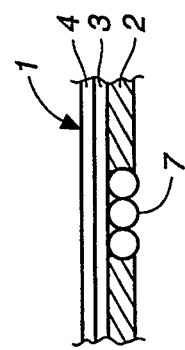
FIG._1B
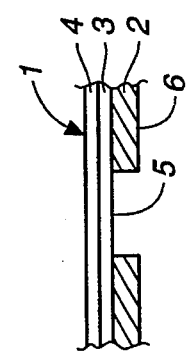
FIG._1A

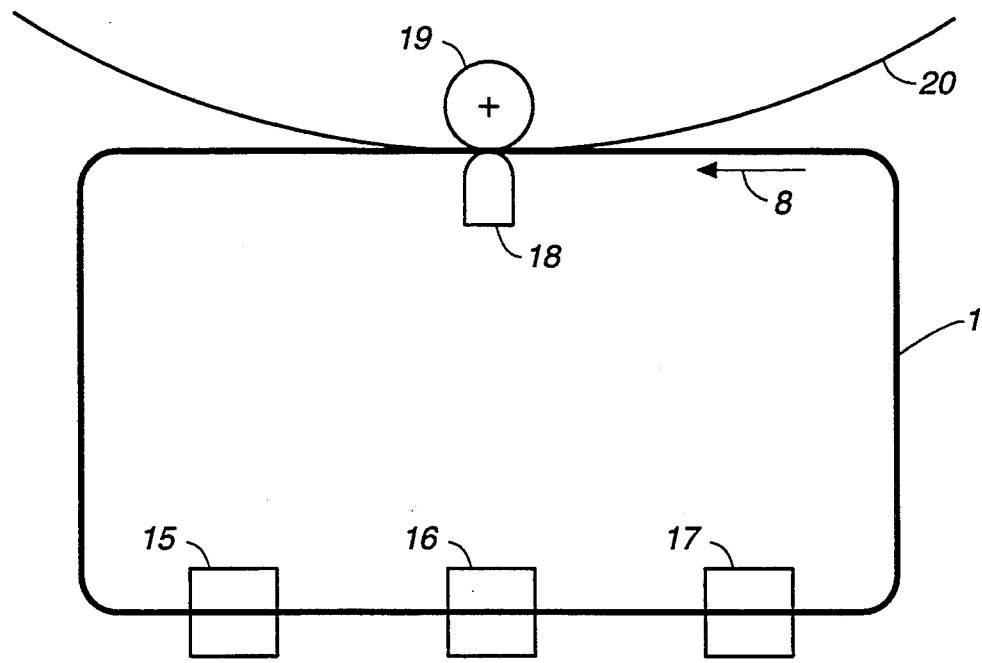
FIG._2
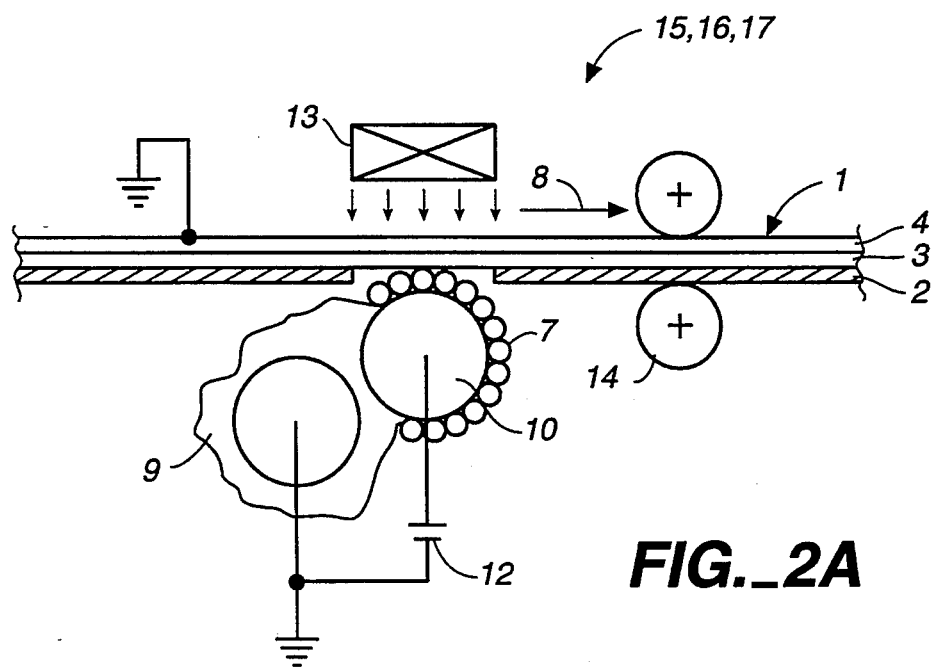
FIG._2A

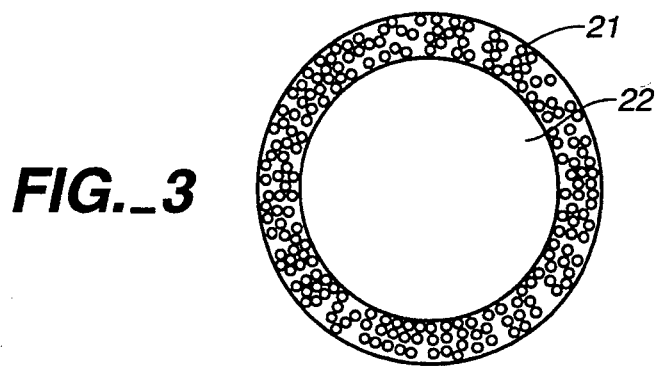
FIG._3
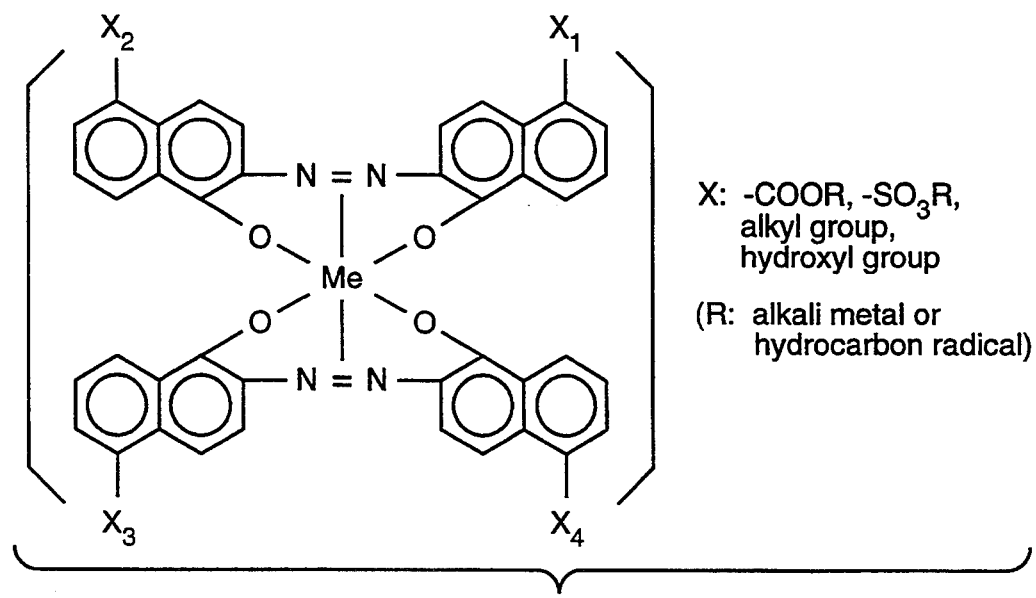
X: -COOR, -SO$_3$R, alkyl group, hydroxyl group
(R: alkali metal or hydrocarbon radical)
FIG._4
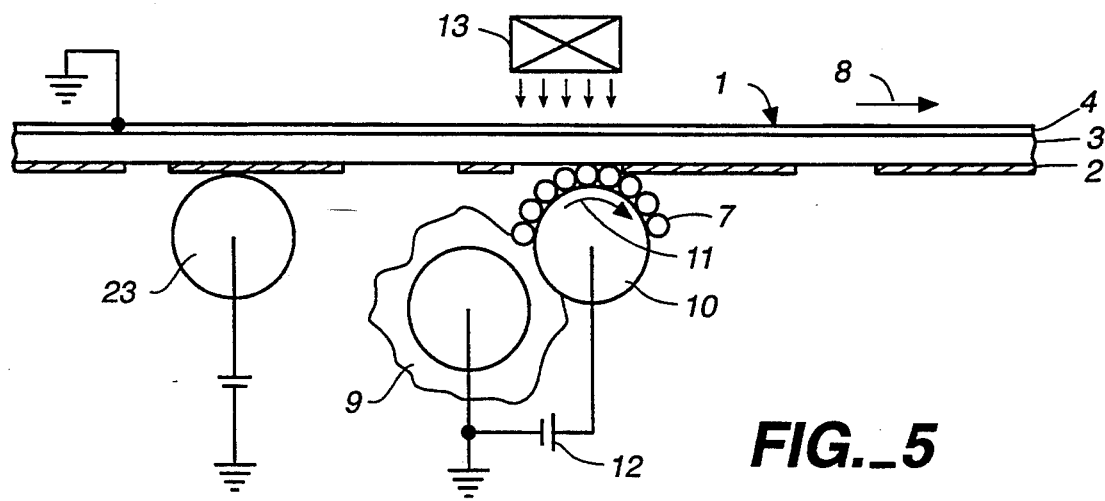
FIG._5

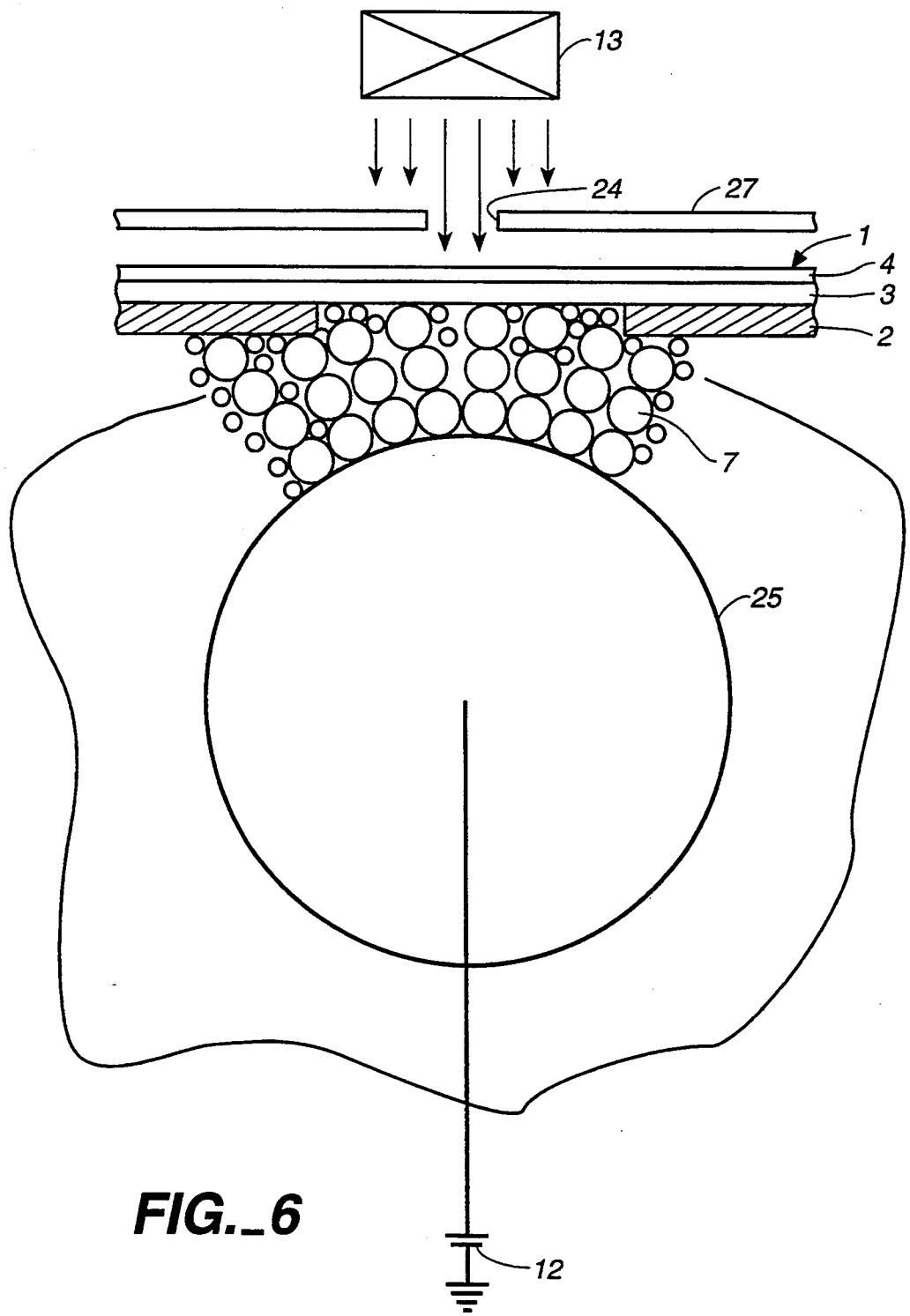
FIG._6

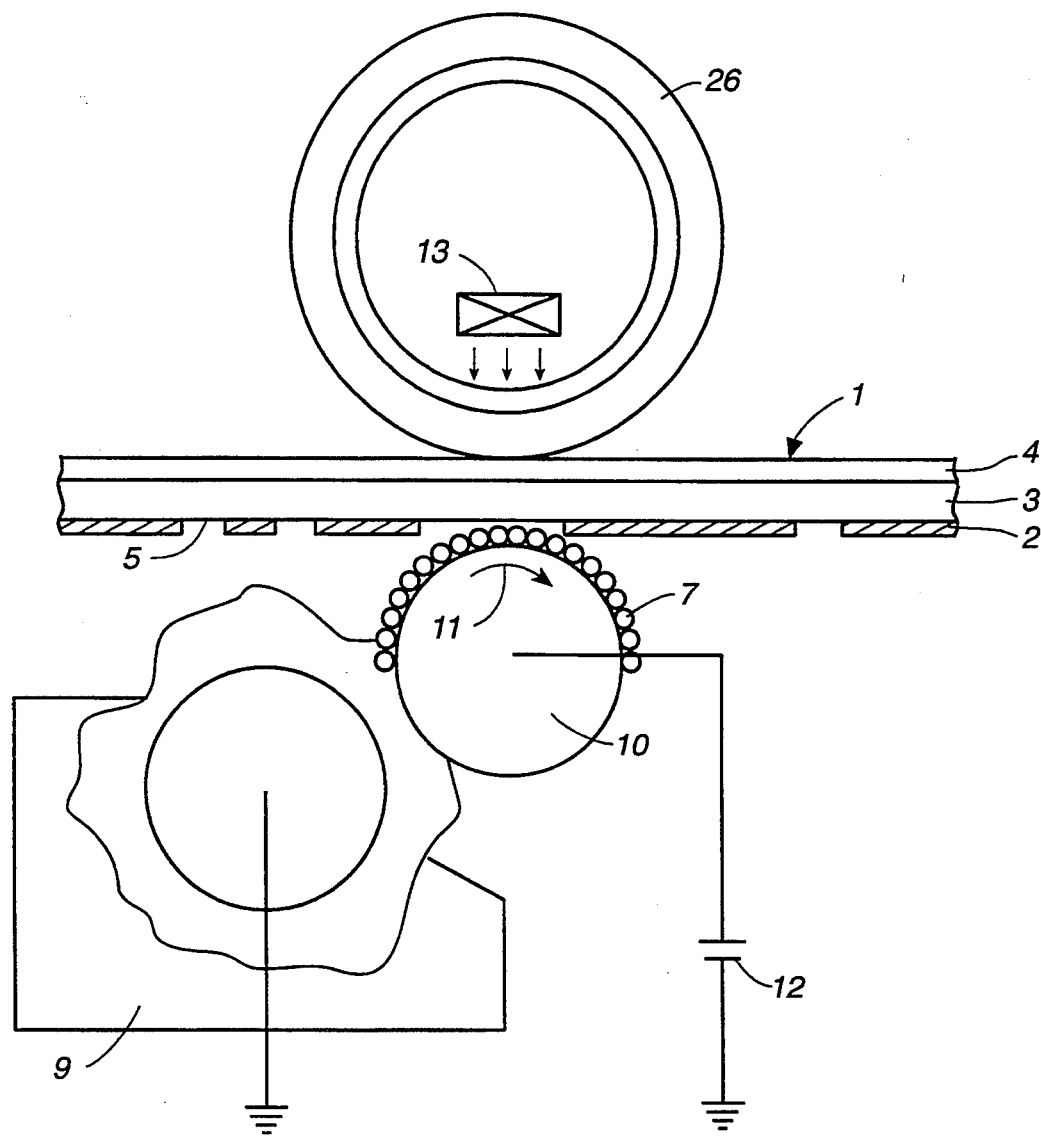
FIG._7
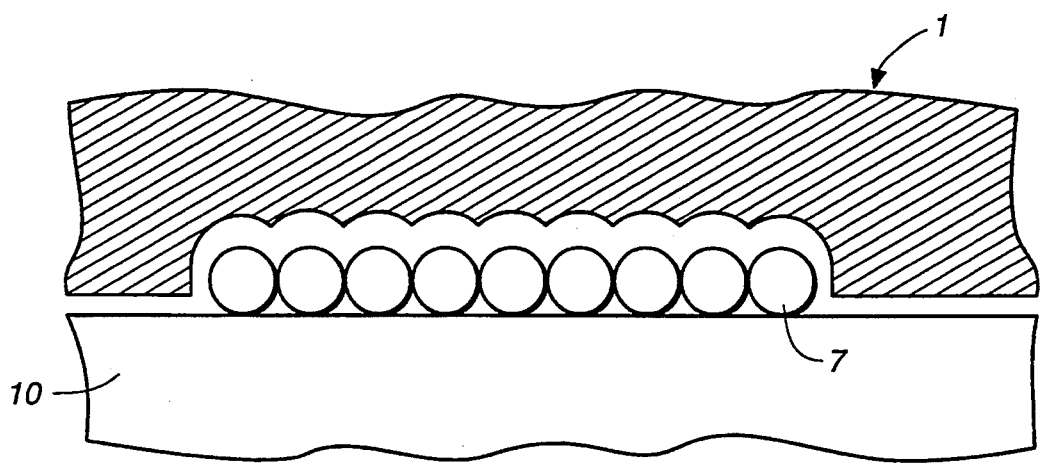
FIG._8

IMAGE FORMATION DEVICE HAVING PHOTOCONDUCTIVE INK BASED INK SHEET RECONDITIONING

FIELD OF THE INVENTION

This is a continuation of Ser. No.: 07/679,066 filed as Oct. 4, 1990 as PCT/JP90/01280, abandoned.

The present invention relates to image formation devices which use a thermal head and an ink sheet to form images by energizing the thermal head and using the heat of the thermal head to transfer the ink to the recording paper (referred to as thermal transfer below). More particularly, the present invention relates to methods and apparatus for reconditioning ink sheets within image formation devices.

BACKGROUND OF THE INVENTION

Some of the recording methods being used as thermal transfer methods include melt transfer recording and sublimal-dye transfer recording, which have been used to realize compact, highly reliable image formation devices.

One example of a regeneration method for the ink sheet is that disclosed in the SID 1985 Digest, pages 143-145. The method disclosed in U.S. Pat. No. 4,467,332 is an ink sheet regeneration method which utilizes a powder ink. As a related technology, an ink sheet regeneration method and device were proposed in Japanese Laid Open Patent Publication 1-295876.

In the method disclosed in the SIP 1985 Digest, pages 143-145, however, a warm-up time is required to melt the ink, much power is required to melt the ink, a mechanism is required to obtain a fixed film thickness for the regeneration ink, the device is large and the mechanism is complicated.

The method disclosed in U.S. Pat. No. 4,467,332 is a regeneration method which uses an ink sheet configured from an ink layer formed on a conductive base film and selectively supplies insulative powder ink to conductive exposed parts after transfer of the ink layer, but since the chargeability of the insulative powder ink varies depending on the environment, the film thickness is not consistent and powder ink adheres to even untransferred parts of the ink layer according to the strength of the electric field. In other words, it is difficult to selectively adhere powder ink to bare areas of the ink layer, and uneven adherence of the powder ink occurs. Therefore, it is difficult to control the ink layer film thickness on the reconditioned ink sheet. This results in an uneven ink layer.

However, the images formed using ink sheet prepared or regenerated by the ink sheet regeneration method and device disclosed in Japanese Laid-Open Patent Publication 1-295876 were high quality images with a high recording density (OD value below), and they also demonstrated a good repetitive characteristic.

The purpose of the present invention is to go beyond that disclosed in Japanese Laid-Open Patent Publication 1-295876 by offering an image formation device which more effectively utilizes the ink sheet and greatly reduces operating costs. Another purpose of the invention is to offer an image formation device with a mechanism for ink sheet regeneration capable of easily accommodating color printing.

SUMMARY OF THE INVENTION

In order to solve these kind of problems, the image formation device of the invention has the following features.

(1) In an image formation device comprising an image formation means that forms images by means of a thermal transfer system and an ink sheet regeneration means that uses powder ink, and which forms images while sequentially regenerating the ink sheet, a process which uses a photoconductive powder ink as the powder ink and supplies the photoconductive powder ink by at least irradiating it with light to make it conductive and a process which reconditions the ink sheet by melting and hardening the supplied powder ink are employed.

(2) The image formation device comprises a mechanism which forms images on recording paper by means of a thermal head, a mechanism which supplies powder ink to the bare areas of the ink layer on the ink sheet and irradiates the ink sheet from the opposite side, and a mechanism which melts and hardens the supplied powder ink using heat.

(3) The base film of the ink sheet is insulative.

(4) The wavelength of the irradiated light is in the near infrared to ultraviolet range.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 1 is a generalized diagram of the image formation device of an embodiment of the invention.

FIG. 1A is a detailed view at the point marked by the line 1A—1A in FIG. 1.

FIG. 1B is a detailed view at the point marked by the line 1B—1B in FIG. 1.

FIG. 1C is a detailed view at the point marked by the line 1C—1C in FIG. 1.

FIG. 2 is a generalized diagram of the image formation device of another embodiment of the invention.

FIG. 2A is a detailed view at the point marked by the line 2A—2A in FIG. 2.

FIG. 3 shows an example of the cross sectional structure of the photoconductive powder ink used in the invention.

FIG. 4 shows the structure of the black dye used in the photoconductive powder ink of the invention.

FIG. 5 shows an example of the voltage application mechanism of the invention.

FIG. 6 shows the supply method of the invention which uses a two-component magnetic brush.

FIG. 7 shows the supply method of the invention which uses an elastic backup roller.

FIG. 8 shows the contact pressure condition during supply when the elastic backup roller of the invention is used.

TABLE OF REFERENCE NUMERALS 1 ink sheet
7 conductive powder ink
9 two-component hopper
10 conductive sleeve
13 exposure system
18 thermal head
19 backup roller
20 recording paper 23 potential application sleeve
26 rubber backup roller

DETAILED DESCRIPTION OF THE INVENTION

A detailed description of the invention follows.

First is a detailed description of the photoconductive powder ink used in the image formation device of the invention. As a result of diligent research and study to achieve photoconductivity, it was discovered that good regeneration could be performed with materials and configurations such as those described below. Basically, they include photoconductive materials, sensitizers, resins which bind photoconductive materials, resins for fixing and colorants.

Photoconductive materials refer to those materials which demonstrate the following properties. Such materials are produced by mixing and diffusing a binding resin with a dye or pigment or coating only a resin and forming it into a film, and they demonstrate a light attenuation of their surface potential, or so-called "zero graphic" characteristic, when charged in darkness and then irradiated with light. The photosensitive materials used in copiers are examples of such materials. More specifically, these include such inorganic pigments as zinc oxide, titanium oxide, zinc sulfide, selenium, cadmium sulfide and a-silicon, such organic pigments as phthalocyanine and quinacridone and such resin materials as carbazole resins.

Sensitizers are selected to increase the sensitivity of photoconductive materials and to select the photosensitive wavelength range, and they include triphenylmethane dyes, diallylmethane dyes, monomethine cyanine, trimethine cyanine, pentamethine cyanine, heptamethine cyanine, styryl dyes, oxonol, merocyanine, cyanine complexes, azenium dyes, azo dyes, anthraquinone dyes, indigo dyes, vinylene dyes and azomethines. Examples of these types of dyes include Rose Bengal, acridine orange, rhodamine B, erythrosine, eosin, fluorescein, brilliant Green and crystal violet.

The following materials can be used as colorants: nigrosine dye, aniline blue, chalco oil blue, chrome yellow, ultramarine blue, Dupont oil red, quinoline yellow, methylene blue colloid, phthalocyanine blue, Malachite Green oxalate, lampblack, oil black, azo oil black, Rose Bengal, crystal violet and Rhodamine B.

Known insulative thermoplastic resins can be used as resins for binding photoconductive materials, and some of those that can be used alone or in combination include polyacrylates, polymethacrylates and other acrylic resins and their copolymers, polystyrene, poly-1-methylstyrene and other styrene resins and their copolymers, polyvinyl colloids, polyvinylidene colloids, polyvinyl fluorides, polyvinylidene fluorides and polyester resins and their copolymers, and polycarbonate resins, cellulose resins and polyarylate resins.

The following low-melting point compounds can be used as inner core particles for fixing: candelilla wax, carnauba wax, rice wax, beeswax, lanolin, montan wax, ozokerite, paraffin wax, microcrystalline wax, petrolatum, polyethylene wax, Fischer-Tropsch synthesis, montan wax derivative, paraffin wax derivative, hardened castor oil, synthetic waxes and other waxes, stearic acid, palmitic acid and other higher fatty acids, low molecular weight polyethylenes, polyethylene oxides, polypropylenes and other polyolefines, and ethylenes, acrylic acid copolymers, ethylene-ester acrylate copolymers, ethylene-vinyl acetate copolymers and other olefine copolymers.

Further, the following materials can be used as required.

1) Metal soap, polyethylene glycol and other surfactants or disperser
2) Electron acceptor organic complexes, polyester hydrochlorides, nitrophmine acid, quaternary ammonium salt, pyridinium salt and other charge control agents
3) Talc and other fillers
4) $SiO_2$, $TiO_2$ and other flowability enhancers.

DESCRIPTION OF THE INK SHEET

Structurally, an ink layer is laminated on a base layer which also serves as a dielectric layer. As shown in FIG. 1, the ink sheet has a transparent or translucent conductive layer provided on the side oriented toward the irradiating light (which is opposite the side having the ink layer). However, the invention is not limited to this, and it includes all ink sheets which have at least a dielectric layer and an ink layer formed on the dielectric layer as their primary components.

The base layer, which also serves as a dielectric layer, should be an insulative material that is transparent or translucent with respect to the irradiated light. The base layer is a film made from simple substances, copolymers, or composites of resins selected from among such organic films as polyesters, polysulfones, polyimides, polyamides, polyarmides, polycarbonates and other organic films or from among such thermoplastic resins as polyvinyl alcohols, polyvinyl pyrrolidones, polyvinyl amines, gum arabic, polyglutamic acid, polyvinyl colloids, polycarbonates, polyvinyl butyral, polystyrenes, polyacrylates, polyesters and cellulose resins, from resins selected from among such thermosetting resins as epoxy resins, silicon resins, urethane resins, melamine resins and alkyd resins, or from nitrides, oxides, carbides and inorganic salts. Preferably, the film should be a heat resistant, easy-to-form film made from polyesters, polysulfones, polyimides or polyarmides. A heat-resistant film can be added when a film with low heat resistance is used.

The conductive layer can be formed from a conductive resin by diffusing and dissolving a conductive agent in a known binder resin, or from a conductive agent alone. Examples of conductive agents that can be used include metal oxide powders, metal powders and salt.

Since the image formation part of the thermal transfer system uses known technology, the following explanations of the embodiments deal primarily with the ink sheet regeneration part. In the descriptions of the various embodiments of the present invention, the term thermal head, refers to generally toa evice which thermally transfers ink from an ink sheet to form an image.

FIRST EMBODIMENT

FIG. 1 is a generalized diagram of the regeneration mechanism of the image formation device of the invention. In the figures, like parts are designated by like reference numerals.

Ink sheet 1 is a take-up cartridge system, which comprises a photoconductive ink layer 2 on an insulator layer 3 and a transparent conductive layer 4 on the opposite side.

Upon completion of printing, the ink sheet wound up in the cartridge is transported in the direction of the arrow 8. As illustrated in FIG. 1A, on ink sheet 1 are formed areas 5 where photoconductive ink layer 2 has been transferred and separated from the ink sheet by the printing operation leaving insulator layer 3 bare, and areas 6 where photoconductive ink layer 2 remains untransferred.

Powder ink 7 made from nearly the same components as the photoconductive ink layer is stored in two-component hopper 9, and it attains a negative charge through frictional electrification. By impressing a positive bias on conductive sleeve 10 which rotates in the direction of arrow 11, the photoconductive powder ink adheres to the sleeve in a thin layer due to electrostatic force when it comes in contact with the sleeve. By grounding transparent conductive layer 4 on the back of ink sheet 1, and impressing a positive bias voltage on conductive sleeve 10, that part of the powder ink 7 supplied to ink sheet 1 which comes in contact with areas 5 is made conductive by full-surface exposure to light from light source 13 and receives a charge injection from the sleeve, thus causing it to adhere to areas 5. However, though untransferred areas 6, which have the same composition as ink layer 2, absorb and disperse the light to which they are exposed, and the untransferred ink layer becomes conductive, powder ink 7 which comes in contact with the untransferred areas 6 retains its initial charge because it is not irradiated by the light, and since a bias is impressed on the sleeve so that it becomes positive, powder ink 7 is transported by the electrostatic force on conductive sleeve 10. In this way, the supply of powder ink 7 can be restricted to only the bare areas of photoconductive ink layer 2, as illustrated in FIG. 1B.

Next, as illustrated in FIG. 1C, the ink layer of the ink sheet is reconditiond by fixing means 14 which fixes photoconductive powder ink 7 on the ink sheet by means of a heat-roller or heat-pressure roller (a heat-roller is used as the fixing means in FIG. 1). The ink sheet is then wound up in a cartridge. Fixing means 14 is not limited to the rollers noted above; i.e., other means such as a flash fixing means or a means which holds the base film and melts the ink from the opposite side of the ink layer by means of a heat plate can be used.

A 4 μm thick polyester film can be used as insulator layer 3 of ink sheet 1, indium-tin oxide (ITO below) can be used as transparent conductive layer 4, and a microcapsule-type ink produced by the method described below and coated with heat and pressure can be used as the photoconductive ink layer. The method by which the microcapsule ink is produced is ,not limited to the method described here.

First, carnauba particles with a particle diameter of 8 μm are dyed directly in an alcohol solution of black dye #1 and used as the inner core particles.

Production of the solution is described below.

| Zinc oxide | 75 parts by weight |
| Cyanine dye | 0.075 parts by weight |

| -continued | |
| Ethyl alcohol | 100 parts by weight |
| Butyryl resin | 75 parts by weight |

A cyanine dye with the following structure was used as a sensitizer.

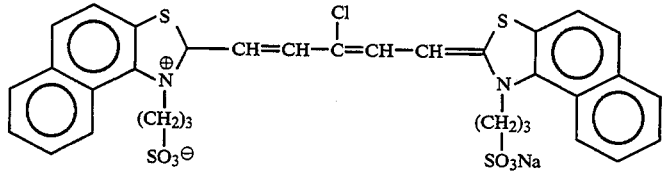

First, except for the inner resin, the above materials are mixed, evenly dispersed by ultrasonic waves and then adsorbed.

The resin is then added to this dispersed solution and dispersed in the same manner by ultrasonic waves, whereby a zinc oxide-dispersed resin is produced. The inner core particles are then added to this resin solution and evenly dispersed by ultrasonic waves. In this way, the stock solution is produced so its solid portion is 20 percent, and the photoconductive powder ink, which has been surface-coated by a spray-dry method, is produced. Examination by electron microscope showed that the zinc oxide-dispersed film had been coated to a thickness of approximately 1 μm.

A generalized cross section of the microcapsule-type photoconductive powder ink produced by this method is shown in FIG. 3. Outer shell photosensitive layer 13 of microcapsule-type photoconductive powder ink is not limited to a pigment-dispersed type as in this embodiment, but it may have any type of composition, such as only a pigment or resin, as long as it has photoconductivity.

An ink sheet 1 which has been used to form an image and is reconditiond in this manner can be used to form images again.

Here, the support member 3 should be heat resistant and easily formable into a film (e.g., polyester, polysulfone, polyimide, polyarmide). Powder ink 7 may be in the form of fine particles, paste, melted or dissolved, or partially melted or dissolved, but the most desirable is fine particles. (A fine particle ink is shown in FIG. 1.)

Using the photoconductive powder ink described above, a printing test was performed using the process of the first embodiment. Since a cyanine dye sensitive to the near infrared range was used as the sensitizing dye, an exposure device which passes light in the near infrared range was employed as the light source. The conditions under which the test was performed were a charge of $-10$ KC/g for the photoconductive powder ink and an impressed bias of $+500$ V on the conductive sleeve. When images were actually formed using this process, a printing speed of 20 pages per minute was obtained at 32 gradations. The images produced had an OD value between 1.2 and 1.5, and good reproducibility was obtained in a 10,000-cycle printing test. Writing was performed at a luminous energy of approximately 10 erg/cm$^2$ on the sleeve of the exposure system.

SECOND EMBODIMENT

The process of the invention does not employ magnetic powder or carbon black, and therefore it is applicable to color printing. FIG. 2 is a generalized diagram of a color image formation device. The following explanation of the process of the invention is based on FIG. 2.

Color printing is performed using a cartridge system which sequentially feeds parts divided into each of the colors yellow, magenta and cyan (designated below as Y, M and C, respectively) as the ink sheet.

An ink sheet and photoconductive powder ink produced by the same methods as in the first embodiment are used.

The compositions of each of the color photoconductive powder inks are as follows.

| Basic composition | |
|---|---|
| Inner core resin | carnauba wax spheres |
| Colorant | |
| Photoconductive agent | zinc oxide |
| Sensitizing dye | |
| Outer shell binding resin | butyryl resin |

The colorants and sensitizers in each of the color powder inks are as follows.

| Cyan powder ink | |
|---|---|
| Colorant | copper phthalocyanine |
| Sensitizers | NK1870, phthalic anhydride |
| Magenta powder ink | |
| Colorant | quinacridone |
| Sensitizers | tetrabromophenol blue, phthalic anhydride |
| Yellow powder ink | |
| Colorant | Bis Azo derivatives |
| Sensitizers | Rose Bengal, phthalic anhydride |

First, the carnauba wax and each of the colorants are kneaded together and powdered. The resulting product is then used as the inner core particles.

Next, the following solution is prepared.

| Zinc oxide | 75 parts by weight |
|---|---|
| Sensitizing dye | 0.075 parts by weight |
| Ethyl alcohol | 100 parts by weight |
| Butyryl resin | 75 parts by weight |

First, the above materials except for the inner resin are mixed, evenly dispersed by ultrasonic waves and adsorbed. Next, a zinc oxide-dispersed resin solution is prepared by adding resin to this dispersion solution and then dispersing the solution with ultrasonic waves in the same manner. The inner core particles are then added to the resin solution and evenly dispersed with ultrasonic waves. In this way, the stock solution is produced so its solid portion is 20 percent, and the color powder inks which have been surface-coated by a spray-dry method are produced with a spherically shaped particle diameter of 10 μm. Examination by electron microscope showed that the zinc oxide-dispersed film is coated in a thickness of approximately 1 μm.

The above three color powder inks are provided at each of the ink regeneration means 15, 16 and 17 and are used to recondition the ink sheet. Such an ink regeneration means is illustrated in FIG. 2A. The ink sheet used in color image formation is divided into repeating groups of sections where each group is comprised of a yellow section, a magenta section and a cyan section. The following process is used.

First, the powder inks are electrified by friction while being mixed in the two component hopper 9 and they then form a thin layer on conductive sleeve 10. Next, the ink sheet is passed over the hoppers corresponding to each of the colors with photoconductive powder ink to those parts of the ink layer transferred by printing and then it is reconditiond. The photoconductive powder ink is supplied by exposing the entire surface to blue light in the case of regeneration of the cyan ink layer and adhering the cyan powder ink in a single layer. The ink sheet is then leveled by heat and pressure. All three parts of the ink sheet are reconditiond in the same manner.

Reconditioned (i.e. reconditiond) ink sheet 1 is transported in the direction of the arrow 8, and an image is formed by thermal head 18 on recording medium 20 which is fed between bckup rollers 19. An ink sheet 1 which has been used to form an image and is reconditiond in this manner can be used to form images again.

When images were actually formed using this process, a printing speed of 20 pages per minute was obtained at 32 gradations. The images produced had an OD value between 1.2 and 1.5, and good reproducibility was obtained in a 10,000 cycle printing test. Writing was performed at this time at a luminous energy in the exposure system of approximately 10 to 20 erg/cm$^2$ for each color.

THIRD EMBODIMENT

Four-color printing was performed using the black photoconductive powder ink (Bk below) of the first embodiment. The system used was nearly the same as that in the second embodiment except that a hopper for black was added. When images were actually formed using this process, natural color reproduction was possible.

FOURTH EMBODIMENT

In this embodiment, an image formation device based on another method of the invention is shown.

That part of powder ink 7 supplied by conductive sleeve 10 to ink sheet 1 which comes in contact with areas 5 is made conductive by full-surface exposure to light from light source 13 and receives a charge injection, thus causing it to adhere to areas 5. However, since untransferred areas 6, which are of the same composition as ink layer 2, absorb and disperse the light to which they are exposed, powder ink 7 which comes in contact with untransferred areas 6 continues to be transported while retaining its initial charge and is bound by electrostatic force to the sleeve. The ink layer retains its resistance while in darkness without exciting a photoconductive effect and its sensitizer is broken down by the heat and pressure operating conditions experienced during production of the sheet. Therefore the electric force between charged particles is small, thus preventing the powder ink from adhering to the ink layer. In this manner, the supply of powder ink 7 can be restricted to only the bare areas of photoconductive ink layer 2.

Next, the ink layer of the ink sheet is reconditiond by a fixing means 14 which fixes powder ink 7 on the photoconductive ink sheet by means of a heat-roller or heat-pressure roller (a heat-roller is used as the fixing means in FIG. 1), and the ink sheet is wound up in the cartridge.

FIFTH EMBODIMENT

Color printing was performed using the process in the fourth embodiment. The device used is nearly the same as that in the second embodiment.

The three color powder inks are provided at each of the ink regeneration means 15, 16 and 17 and are used to recondition by the following method. First, they are electrified by friction while being mixed in the two component hopper 9 and then formed in a thin layer on the conductive sleeve 10. Next, the ink sheet divided up into each of the colors is supplied over the hoppers corresponding to each of the colors with photoconductive powder ink to those parts of the ink layer transferred by printing and then is reconditiond. The photoconductive powder ink is supplied by exposing the entire surface to blue light in the case of regeneration of the cyan ink layer and adhering the cyan powder ink in a single layer. The photoconductive ink is then fixed by heat rolling at a fixing temperature of 150° C. to level the ink sheet. All three colors of the ink sheet are reconditiond in the same manner.

An ink sheet 1 which has been used to form an image and is reconditiond in this manner can be used to form images again. No change in resistance was observed at this time when the ink sheet was irradiated with light corresponding to the colors. This indicates that the sensitizing dye (e.g., NK1870 in the case of cyan ink) is broken down by the means for fixing the photoconductive powder ink on the ink sheet, thus losing its sensitivity.

When images were actually formed using this process, a printing speed of 20 pages per minute was obtained at 32 gradations. The images produced had an OD value between 1.2 and 1.5, and good reproducibility was obtained in a 10,000-cycle printing test. Writing was performed at this time at a luminous energy of approximately 10 to 20 erg/cm$^2$ for each color in the exposure system. Since the ink sheet has high resistance at this time, the image force between charged particles, which make up the photoconductive powder ink, is small even when they contact, thus having the effect to prevent the appearance of background.

SIXTH EMBODIMENT

As was seen in the fourth embodiment, when the reconditiond ink sheet is insulative, a stored charge results due to friction during transport as the number of regenerations increases. This can cause the appearance of background, and therefore it is desirable that the surface potential of the ink sheet be uniform when it contacts the sleeve during regeneration. In this embodiment, the appearance of background was prevented by providing a mechanism which applied a prescribed potential to the ink sheet before the powder ink was supplied to it from the sleeve. FIG. 5 is a generalized diagram of this process. The potential application mechanism illustrated here uses a conductive sleeve, but it is not limited to this, in that a conductive brush, corona discharge device, etc., can be used.

When images were actually formed using this process, a printing speed of 20 pages per minute was obtained at 32 gradations. The images produced had an OD value between 1.2 and 1.5, and good reproducibility was obtained in a 10,000-cycle printing test.

SEVENTH EMBODIMENT

Since photoconductive powder ink can be selectively supplied according to the wavelength of the light, color printing can be accommodated with only one powder ink hopper.

The three color powder inks Y, M and C randomly formed in a thin film on the conductive sleeve are supplied to the ink sheet. As for the shape of the ink sheet, a similar shape to the one of the second embodiment can be employed. Powder ink 7 which comes in contact with the areas 5 where the photoconductive ink layer 2 has been transferred and separated from the ink sheet leaving the insulator layer 3 bare is fully exposed to blue light in the case of regeneration of the cyan ink layer, for example, and the cyan powder ink is adhered in a single layer. However, since powder ink 7 which comes in contact with untransferred parts 6 is not irradiated by the light because the cyan ink layer absorbs and diffuses the exposed blue light, it retains its initial charge and is transported on conductive sleeve 10 by the electrostatic force. In this way, the supply of powder ink 7 can be restricted to only the bare areas of photoconductive ink layer 2. The color ink sheet is then reconditiond in the same manner as in the second embodiment.

When images were actually formed using this process, a printing speed of 20 pages per minute was obtained at 32 gradations. The images produced had an OD value between 1.2 and 1.5, and good reproducibility was obtained in a 10,000-cycle printing test.

EIGHTH EMBODIMENT

A thin layer on the conductive sleeve is used to replenish the ink layer made up of photoconductive powder ink, but it is possible to use a two-component mix of particles made from a magnetic ferrite or iron powder material and a powder ink formed as a brush on a magnetic sleeve to replenish the ink layer directly. FIG. 6 shows an example of this. A slit 24 in mask 27 that is narrower than the contact surface (nip width) between magnetic brush 25 and ink layer 7 is provided and light is passed through it. The remainder of the method is the same as in the first configuration. This prevents the splashing of powder ink and yields good print quality with good reproducibility.

NINTH EMBODIMENT

Depending on the contact between the sleeve and the dielectric surface when supplying photoconductive powder ink to the dielectric surface, an air gap may form which reduces the effective adhesion electric field to which the powder ink is subjected or the conductive path may occasionally form and disappear, and therefore it is important achieve uniform contact in order to achieve uniform adhesion.

FIG. 7 shows a generalized diagram of the process of an image formation device in which uniform contact is attempted using the photoconductive powder ink of the invention. The basic configuration is the same as that of the first embodiment.

A transparent acrylic rubber is used for the rubber backup roller 26, and the surface is coated with silicon by a spray method in order to achieve sufficient smoothness.

The transparent elastic body used has a JIS hardness of 30 and a transmissivity of 95%, and the nip width when set against the opposing member is approximately 2 mm. The photoconductive powder ink, frictionally electrified by the two-component magnetic brush 25, is formed in a thin layer on the conductive sleeve 10 according to the strength of the electric field. This photoconductive powder ink formed in a thin layer is used to form the image by pressing conductive sleeve 10 and the roller against each other, impressing an electric field between the two and irradiating the ink with light from the exposure system 13. The contact pressure condition during supply is depicted in FIG. 8. Reverse charge injection does not occur since point contact with the supply sleeve is maintained. Further, a low-cost semiconductor laser can be used as the light source for the exposure system since near infrared sensitivity is increased by using zinc oxide as the sensitizing dye. Only the powder ink irradiated by light and made conductive is injected with a charge and forms a single layer on the dielectric surface. Next, the powder ink is fixed by heating with a heat roller 14.

When images were actually formed by this process, a printing speed of 20 pages per minute was obtained at a resolution of 300 DPI. An OD value of 1.5 was obtained for solid images. Further, good images were obtained with good reproducibility in a 10,000 cycle print test. Writing was performed at a luminous energy greater than 10 erg/cm$^2$ in the exposure system.

Transparent rubber is used in the contact pressure system of this embodiment, but actual devices are not limited to this; i.e., a spring system, air damper system or a combination of these can also be used.

TENTH EMBODIMENT

The photoconductive powder ink is produced using zinc oxide as in the first embodiment, and the process was tested using various types of transparent elastic bodies. Table 1 shows the relationship of print quality to the elastic body material and the JIS hardness.

The result of using a cylindrical acrylic resin drum is also shown for the sake of comparison. A polyethylene terephthalate (PET) film backed with ITO is applied to the surface of the drum. The thickness of the elastic body is 2 mm. It goes without saying that the allowable range of the hardness of the rubber used varies with the thickness of the elastic body. In the table, H indicates the JIS hardness.

TABLE 1

| No. | Material | H(°) | Print Quality |
|---|---|---|---|
| 1 | Acrylic | 20 | Sharp |
| 2 | Silicon | 20 | Sharp |
| 3 | Acrylic | 30 | Sharp |
| 4 | Silicon | 30 | Sharp |
| 5 | Acrylic | 40 | Sharp |
| 6 | Acrylic | 50 | Low density |
| 7 | Acrylic | 60 | Some appearance of background |
| 8 | Acrylic resin | — | Much dropout |

As can be seen in Table 1, adhesion becomes uniform and therefore sharp printing is possible, when a material with a JIS hardness in the range 20° to 40° is used. When the hardness is greater than 50, the amount supplied is small, which reduces printing density and results in the appearance of background. When an acrylic drum is used, contact is not uniform, resulting in significant dropout.

ELEVENTH EMBODIMENT

Using the same photoconductive ink as in the first embodiment, the process was tested employing transparent rubber with various transmissivities. The material used was an acrylic rubber. Table 2 shows the relationship between the transmissivity of the acrylic rubber and print quality.

TABLE 2

| No. | Transmissivity (%) | Print Quality |
|---|---|---|
| 1 | 95 | Sharp |
| 2 | 90 | Sharp |
| 3 | 80 | Good |
| 4 | 70 | Low density |
| 5 | 60 | Indiscernible |

As can be seen in Table 2, the luminous energy dropped with a decrease in transmissivity, and therefore adhesion was not uniform. Test conditions were set for a printing rate of 10 pages per minute.

TWELFTH EMBODIMENT

The process employing the elastic body of the invention can also be applied to color printing.

As in the ninth embodiment, a transparent acrylic rubber is used on the drum surface 9, and printing is performed with a device which uses a drum whose surface is coated with silicon by a spray method in order to achieve sufficient smoothness. The four color powder inks Y, M, C and Bk are provided at each of the ink regeneration means for each color. Supply and regeneration are performed in the same manner as in the second embodiment. When images were actually formed by this process, a printing speed of 5 pages per minute was obtained at 32 gradations. An OD value of greater than 1.5 was obtained for solid images, and good images were obtained with good reproducibility in a 10,000 cycle print test. Writing was performed at a luminous energy greater than 10 erg/cm$^2$ in the exposure system. In this way, sharp color images were obtained with good reproducibility.

THIRTEENTH EMBODIMENT

The ink sheet used in the invention comprises a base film made from 4-μm-thick ITO/aramid, a dielectric layer made from (100-X) wt % acrylic resin and X wt % ITO and coated on the side opposite the conductive layer in a thickness of 1 μ, and a photoconductive powder ink coated on top of that. Printing and regeneration were performed using this ink sheet in a thermal transfer-type image formation device. Table 3 shows the results of an investigation of the correlation of the supply condition of the powder ink and print quality to the resistivity of the dielectric layer. In the table, p is the resistivity (Ωcm), A is the supply condition and B is the print quality.

TABLE 3

| X | P | A | B |
|---|---|---|---|
| 1 | 10$^{14}$ | Adheres in single layer | Good |
| 3 | 10$^{10}$ | Adheres in nearly single layer | Good |
| 5 | 10$^{8}$ | Adheres in nearly single layer | Good |
| 10 | 10$^{6}$ | Small amount adheres | Low density |
| 20 | 10$^{5}$ | None adheres | Printing not possible |

Here, the supply condition is shown as the ratio of adhered powder ink per unit of solid area expressed as a percentage, where "adheres in nearly single layer" indicates an adherence of 90 percent or better, "small amount adheres" indicates less than 10 percent adherence and "none adheres" indicates less than 1 percent adherence.

FOURTEENTH EMBODIMENT

An ink sheet is used with a base made from a non-deposition 4-μm-thick aramid film and on which a photoconductive powder ink is coated. Powder ink is supplied to the non-coated surface of the ink layer by pressing the ITO-deposited glass sleeve against the ink film. The light source is positioned inside the glass sleeve. The powder ink is supplied by subjecting the ink to a good charge injection via the electric field between the contact areas equivalent to the nip surface.

FIFTEENTH EMBODIMENT

The base film of the ink sheet used in the invention must be transparent or translucent to the light used for exposure, so experiments were performed with ink sheets of various transmissivities. The experiments were carried out with ink sheets made from 4-μm-thick PET on which ITO had been deposited and aluminum had been further deposited to change the transmissivity. The transmissivity was separately measured using a spectroscope, and print quality was evaluated using the same device and the same luminous energy as in the first embodiment and at a printing speed of 10 pages per minute.

TABLE 4

| No. | Transmissivity (%) | Print Quality |
| --- | --- | --- |
| 1 | 95 | Sharp |
| 2 | 90 | Sharp |
| 3 | 80 | Good |
| 4 | 70 | Good |
| 5 | 60 | Good |
| 6 | 50 | Low density |
| 7 | 40 | Indiscernible |

As can be see in Table 4, the luminous energy fell as the transmissivity decreased, and therefore the supply of powder ink was not uniform and print quality was poor. Test conditions were set for a printing rate of 10 pages per minute.

The processes in which the photoconductive powder ink of the invention is used are not limited to the embodiments described above, and it can be applied to all processes which use photoconductive powder ink.

APPLICABILITY TO INDUSTRY

As described above, the image formation device of the invention has the following efficacies.

(1) In an image formation device comprising an image formation means which forms images using a thermal transfer system and an ink sheet regeneration means, and which forms images while sequentially regenerating the ink sheet, the selective supply of powder ink and the formation of a uniform film thickness on the reconditiond ink sheet become possible by employing a process which uses a photoconductive powder ink as the powder ink and supplies the photoconductive powder ink by irradiating it with light to make it conductive and a process which reconditions the ink sheet by melting and hardening the supplied powder ink.

(2) The selective supply of powder ink and a reconditiond ink sheet with a uniform film thickness are made possible by using a configuration comprising a mechanism which forms images on recording paper by means of a thermal head, a mechanism which supplies powder ink to the bare areas of the ink layer on the ink sheet and irradiates the ink sheet from the opposite side, and a mechanism which melts and hardens the supplied powder ink using heat.

(3) By using an insulative base film for the ink sheet, the selective supply of powder ink and a reconditiond ink sheet with a uniform film thickness are made possible.

(4) By using an irradiated light with a wavelength in the near infrared to ultraviolet range, the selective supply of powder ink and a reconditiond ink sheet with a uniform film thickness are made possible.

By means of the image formation device of the invention, an ink sheet regeneration process becomes possible which uses a powder ink containing no magnetic powder or carbon black, and therefore a thermal transfer type image formation device equipped with an ink sheet regeneration means can be offered which accommodates color printing and reduces operating costs by increasing the utilization of the ink sheet.

Based on the above, the image formation device of the present invention can be particularly useful if applied to printers, video printers, facsimiles, copiers, etc.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. An image formation device comprising:
   a) a recording medium;
   b) an ink sheet having a dielectric layer and an ink layer disposed thereon, arranged to travel in a continuous pathway, wherein said dielectric layer is substantially transparent to a portion of the visible electromagnetic spectrum;
   c) a means for bringing said recording medium and said ink sheet into contact with each other and for transferring portions of said ink layer onto said recording medium thereby leaving bare areas on the sheet;
   d) a photoconductive powder ink;
   e) an exposure system;
   f) a two-component hopper; and
   g) a positively charged conductive rotating sleeve;
   wherein said two-component hopper is operable to receive and store a supply of said photoconductive powder ink and further operable to impart a negative charge to said photoconductive powder ink, said conductive sleeve is coupled to said two-component hopper such that said conductive sleeve has access to said photoconductive powder ink within said two-component hopper, said positively charged sleeve picking up particles of the negatively charged powder ink and carrying the powder ink to a transfer station where the exposure system directs radiation toward the sleeve with the ink sheet being position therebetween, said radiation from the exposure system passing through the transparent dielectric layer on the bare areas and striking the photoconductive powder ink and changing the negative charge to a positive charge supplied by the positively charged sleeve, the positively charged powder ink thereafter being electrostatically transferred to the ink sheet, untransferred areas on the ink sheet blocking light from the exposure system so that the powder ink on the sleeve remains negatively charged and is not attracted to the sheet; and h) means for fixing the transferred photoconductive powder ink to the bare areas of the ink sheet to thereby provide a regenerated ink sheet.

2. The image formation device of claim 1 wherein said means for fixing comprises a heat-roller.

3. The image formation device of claim 1 wherein said exposure system is operable to produce light energy corresponding to a portion of the electromagnetic spectrum.

4. The image formation device of claim 1 which further comprises a transparent hollow cylindrical backup roller disposed so as to surround said exposure system, while being in contact with said ink sheet.

5. The image formation device of claim 4 wherein said backup roller comprises acrylic rubber.

6. The image formation device of claim 5 wherein said backup roller further comprises a silicon coating for smoothness.

7. A method of reconditioning ink sheets comprising the steps of:

a) transporting an ink sheet having a light transmissive base layer, said base layer having a first side and a second side, an electrically conductive layer disposed on said first side of said base layer, and an ink layer disposed on said second side of said base layer, through a thermal print head wherein a portion of said ink layer is transferred onto a recording medium and whereby bare areas are formed on said ink sheet;

b) grounding said conductive layer;

c) charging a photoconductive powder ink contained in a two-component hopper with a negative charge;

d) impressing a positive bias on a rotating conductive sleeve coupled to said two-component hopper;

e) forming a layer of said photoconductive powder ink on said conductive sleeve by means of electrostatic force;

f) transporting said ink sheet having bare areas between said conductive sleeve and an opposed exposure system;

g) exposing said layer of said photoconductive powder ink on said conductive sleeve to light from said exposure system passing through said ink sheet bare areas so that only a first portion of said photoconductive powder ink which is physically subjacent to said ink sheet bare areas assumes a positive charge;

h) adhering said first portion of said photoconductive powder ink to said ink sheet bare areas by attraction of the positively charged ink to the grounded conductive layer; and i) fixing said adhered photoconductive powder ink to said ink sheet.

8. The method of reconditioning ink sheets as claimed in claim 7, further comprising the step of applying an electrical potential to regions of said ink sheet where said ink layer has not been removed by printing, prior to said steps (f), (g) and (h) of exposing, adhering and fixing.

9. The method of reconditioning ink sheets as claimed in claim 7, wherein said ink sheets have a number, N, of different color inks, and steps (a) through (h) are repeated N times.

10. The method of reconditioning ink sheets as claimed in claim 7, wherein said electrically conductive layer is comprised of Indium-Tin-Oxide (ITO).

11. The method of reconditioning ink sheets as claimed in claim 7, wherein said transmissive base layer is comprised of a polyester film approximately 4 microns thick.

12. In an image formation device using a transportable ink sheet having a transparent base layer, an electrically conductive layer on one side of the base layer and a conductive ink layer on an opposite side of the base layer, said device having a print head for transferring a portion of the ink layer to a recording medium whereby bare areas are formed on said ink sheet, the improvement comprising an apparatus for reconditioning the ink sheet for reuse, said apparatus including:

means for applying a charge of a first polarity to the conductive layer of the ink sheet;

a hopper containing photoconductive ink particles;

means for applying a charge of said first polarity to the ink particles in the hopper;

a rotating oppositely charged sleeve for picking up the charged ink particles and carrying the charged ink particles to a transfer station;

said transfer station including an exposure system for directing radiation toward the sleeve, the ink sheet being conveyed through the transfer station between the exposure system and the sleeve, the radiation from the exposure system passing through the transparent base layer and the bare areas on the ink sheet whereby the ink particles become oppositely charged, the oppositely charged ink particles being attracted to the charged conductive layer on the ink sheet opposite the bare areas whereby the bare areas are covered with ink particles; and fixing means for fixing the transferred ink particles on the ink sheet.

13. The apparatus of claim 12 which further comprises:

means for contacting the ink layer, prior to the transfer station and applying a uniform potential thereto.

14. The apparatus of claim 13 wherein the means for contacting comprises a positively biased roller.

* * * * *

UNITED STATES PATENT AND TRADEMARK OFFICE
CERTIFICATE OF CORRECTION

PATENT NO.   : 5,451,986

DATED        : September 19, 1995

INVENTOR(S)  : Teruyuki Mizumoto, et. al.

It is certified that error appears in the above-identified patent and that said Letters Patent is hereby corrected as shown below:

Title page, item [54], change "Having Photoconductive Ink Based Ink Sheet Reconditioning" to --For Regenerating an Ink Sheet and Method of Reconditioning Ink Sheets--.

Signed and Sealed this

Nineteenth Day of May, 1998

*Attest:*

BRUCE LEHMAN

*Attesting Officer*   *Commissioner of Patents and Trademarks*